C. BIRDSONG.
PLOW.
APPLICATION FILED MAR. 16, 1911.
1,009,824.
Patented Nov. 28, 1911.
2 SHEETS—SHEET 1.
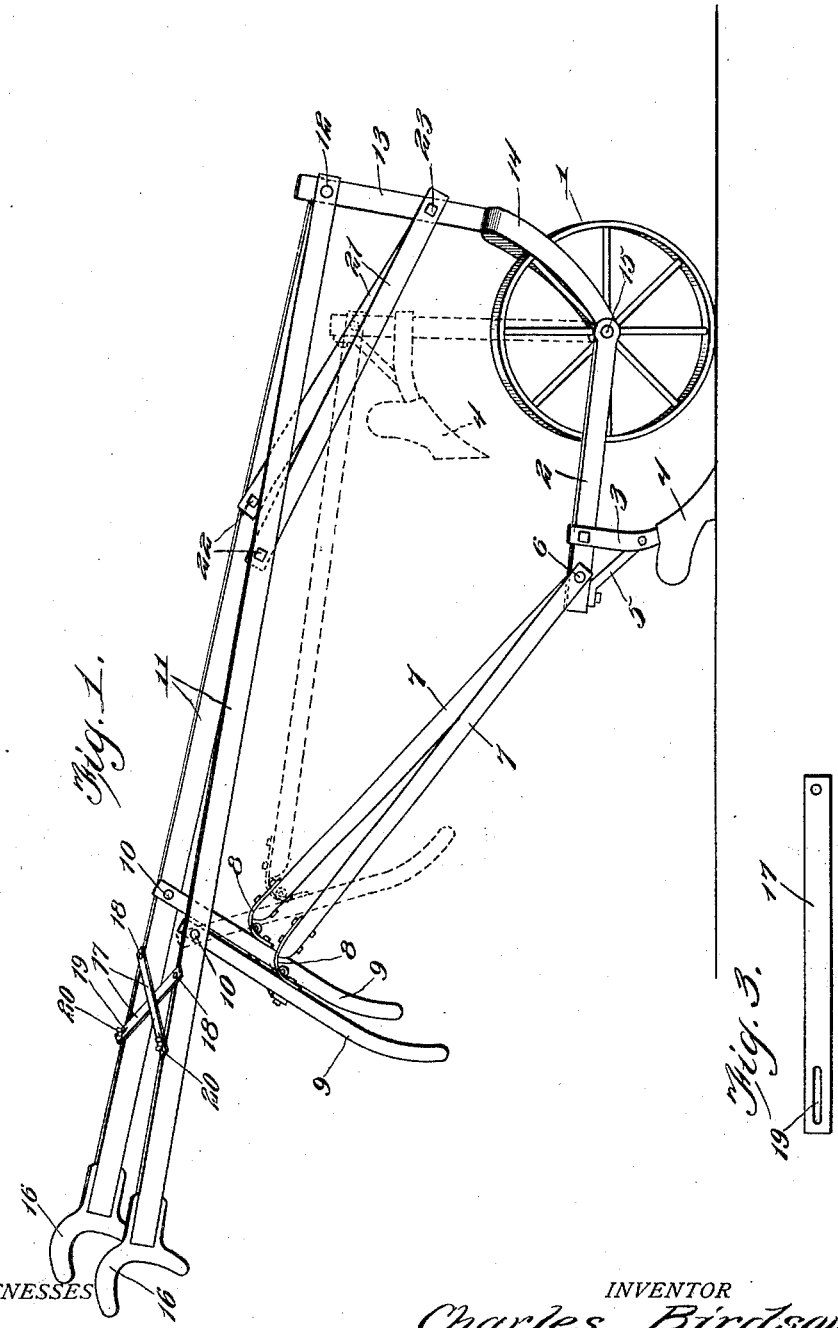
WITNESSES
INVENTOR
Charles Birdsong

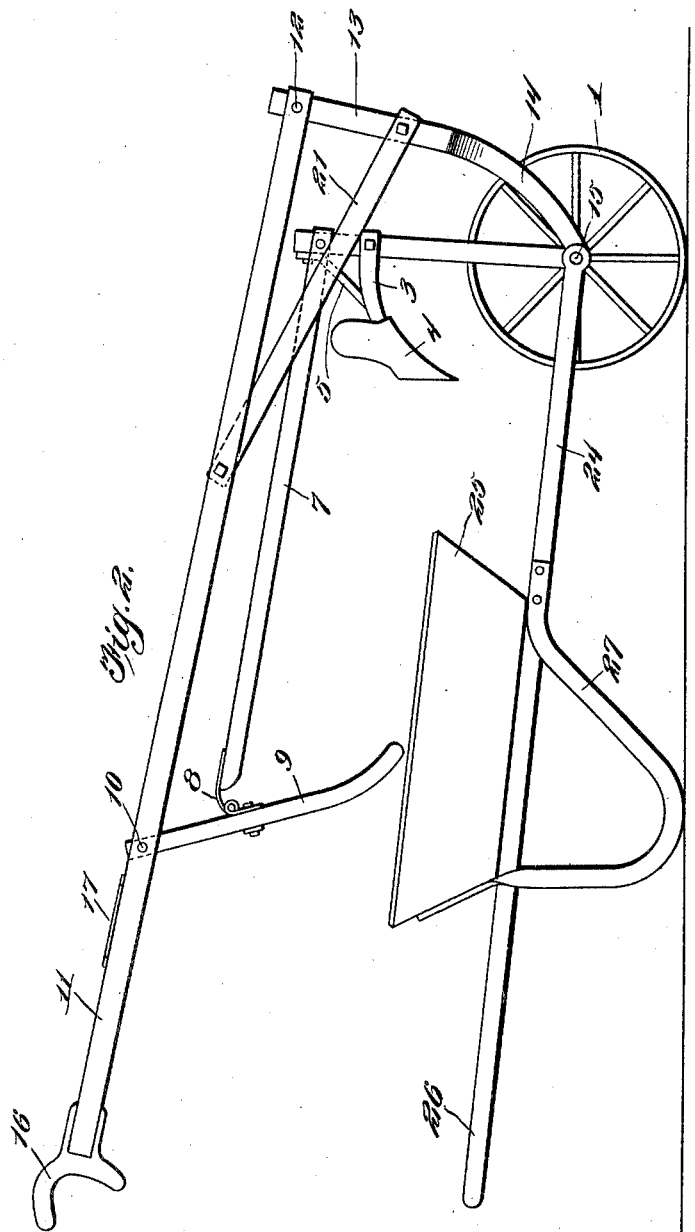

UNITED STATES PATENT OFFICE.

CHARLES BIRDSONG, OF WOODLAWN, ALABAMA, ASSIGNOR OF ONE-HALF TO G. L. ALLISON, OF BIRMINGHAM, ALABAMA.

PLOW.

1,009,824. Specification of Letters Patent. Patented Nov. 28, 1911.

Application filed March 16, 1911. Serial No. 614,838.

*To all whom it may concern:*

Be it known that I, CHARLES BIRDSONG, a citizen of the United States, residing at Woodlawn, in the county of Jefferson and State of Alabama, have invented certain new and useful Improvements in Plows, of which the following is a specification.

This invention relates to plows, and one of the principal objects of the invention is to provide simple, reliable, and efficient means for mounting a plow on a frame having a single ground wheel, means being provided for attaching a wheel barrow frame to the wheel and throwing the plow out of position for use so that the device may be instantly converted from a plow to a wheel barrow or vice versa.

Another object of the invention is to provide a plow frame mounted on a ground wheel and shoulder supports on bars on the frame for engaging the shoulders of the operator to assist in supporting and guiding the plow, means being also provided for throwing the plow out of operative position and engaging the wheel barrow to the frame so that the device may be quickly converted from a plow to a wheel barrow.

Still another object of the invention is to provide a simple convertible plow and wheel barrow which can be used for many purposes around a farm, such as digging potatoes, and other vegetables, and placing them in the wheel barrow for conveying them from the field to the place of storage.

These and other objects may be attained by means of the construction illustrated in the accompanying drawings, in which, Figure 1 is a perspective view of a combined plow and wheel barrow with the parts adjusted for use as a plow, said view showing in dotted lines the position of the plow when thrown out of operation ready for the attachment of the barrow to the frame; Fig. 2 is a side elevation of the device adjusted for use as a wheel barrow.

Referring to the drawing, the numeral 1 designates the ground wheel journaled to the front end of the plow beam 2. Connected to the plow beam 2 is a standard 3 and attached to the standard is a plow share or cultivator 4. The standard 3 is connected to the beam 2 by means of a suitable brace 5. Pivoted to the rear end of the beam 2 on a bolt 6 are bars 7. The rear ends of the bars 7 are connected by means of hinges 8 to handle members 9, said handle members being pivoted at 10 to supporting bars 11, said supporting bars being pivoted at their front ends upon a bolt 12 connected to the shank 13 of a fork 14, said fork being pivotally mounted on the spindle 15 of the wheel 1. On the rear ends of the bars 11 are shoulder supports 16 adapted to rest upon the shoulders of the operator. For adjusting the bars 11 slotted plates 17 are provided, said plates being pivoted at 18 to the bars 11 and adjustably connected by means of slots 19 and winged nuts 20 for spreading the bars apart to conform to the width of the shoulders of the operator. Braces 21 are connected at one end by means of bolts 22 to the bars 11 while the opposite ends of said braces are pivotally connected at 23 to the shank 13 of the fork 14.

When the device is adjusted for use as a plow as shown in Fig. 1, the shoulder supports rest upon the shoulders of the operator and the handles 9 are grasped for guiding the plow or cultivator. When it is desired to attach the barrow frame to the implement, the plow is thrown up into the position shown in dotted lines in Fig. 1 and the barrow frame is then connected to the spindle 15 of the wheel 1. The barrow frame comprises a pair of parallel bars 24 mounted on the spindle 15, said bars supporting a box or receptacle 25 and the rear ends 26 of said bars serving as handles for the barrow. Supporting legs 27 are connected to the bars 24. The barrow frame can be quickly disconnected from the wheel whenever it is desired to use the device as a plow.

From the foregoing it will be obvious that an implement made in accordance with my invention is particularly convenient for many purposes about a farm, like digging potatoes or other vegetables, and it will be obvious that the plow frame may be entirely disconnected from the wheel if it is desired to use the wheel barrow without the plow frame.

I claim:—

A plow comprising a beam, a ground wheel pivoted to the front end of said beam, bars connected to the rear end of said beam, handles hinged to said bars, a fork connected to the front end of the beam, said fork having an upwardly projecting shank, bars pivotally connected to said shank, means for adjusting said bars laterally, and shoulder supports on the ends of said bars.

In testimony whereof I affix my signature in presence of two witnesses.

CHARLES BIRDSONG.

Witnesses:
J. G. HARRIS,
P. O. RANDALL.